US012645190B2

(12) United States Patent
Akashi et al.

(10) Patent No.: US 12,645,190 B2
(45) Date of Patent: Jun. 2, 2026

(54) APPARATUS AND METHOD FOR SWITCHING A SUBSTRATE PROCESSING APPARATUS TO VIRTUAL SENSOR BASED CONTROL

(71) Applicant: Tokyo Electron Limited, Tokyo (JP)

(72) Inventors: Nao Akashi, Hokkaido (JP); Nobutoshi Terasawa, Hokkaido (JP); Kazushi Shoji, Hokkaido (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 411 days.

(21) Appl. No.: 18/218,408

(22) Filed: Jul. 5, 2023

(65) Prior Publication Data

US 2024/0012373 A1     Jan. 11, 2024

(30) Foreign Application Priority Data

Jul. 8, 2022     (JP) ................................. 2022-110471

(51) Int. Cl.
*G05B 13/04*          (2006.01)
(52) U.S. Cl.
CPC ................................. *G05B 13/044* (2013.01)
(58) Field of Classification Search
None
See application file for complete search history.

(56) References Cited

U.S. PATENT DOCUMENTS

| | | | | |
|---|---|---|---|---|
| 6,207,937 | B1 * | 3/2001 | Stoddard | ................. C30B 25/10 |
| | | | | 392/416 |
| 2005/0071034 | A1 * | 3/2005 | Mitrovic | ................. G06F 30/20 |
| | | | | 700/121 |
| 2008/0312756 | A1 * | 12/2008 | Grichnik | ............ G05B 19/0423 |
| | | | | 707/999.107 |
| 2019/0033850 | A1 * | 1/2019 | B R | ......................... G05B 9/02 |
| 2020/0343114 | A1 * | 10/2020 | Yamaguchi | ....... H01L 21/67248 |
| 2023/0237373 | A1 * | 7/2023 | Shingaki | ................ G06N 20/00 |
| | | | | 706/12 |
| 2024/0004749 | A1 * | 1/2024 | Zhang | ................. G06F 11/3058 |

FOREIGN PATENT DOCUMENTS

JP          2021-132140 A       9/2021

* cited by examiner

*Primary Examiner* — Bernard G Lindsay
(74) *Attorney, Agent, or Firm* — Venjuris, P.C.

(57)          ABSTRACT
An information processing apparatus includes an acquisition unit that acquires a physical sensor output value output from a plurality of physical sensors installed in a substrate processing apparatus; a prediction unit that predicts a virtual sensor output value of a virtual sensor corresponding to a prediction target physical sensor by using a statistical model or a physical model, based on a degree of similarity between the physical sensor output value and data learned by the statistical model; an abnormality determination unit that compares the physical sensor output value of the prediction target physical sensor with the virtual sensor output value of the virtual sensor, thereby determining whether an abnormality occurs in the physical sensor; and an instruction unit that switches from a control based on the physical sensor output value to a control based on the virtual sensor output value when determined that the abnormality occurs in the physical sensor.

6 Claims, 11 Drawing Sheets

APPARATUS AND METHOD FOR SWITCHING A SUBSTRATE PROCESSING APPARATUS TO VIRTUAL SENSOR BASED CONTROL

CROSS-REFERENCE TO RELATED APPLICATIONS

The present application is based on and claims priority from Japanese Patent Application No. 2022-110471, filed on Jul. 8, 2022, with the Japan Patent Office, the disclosure of which is incorporated herein in its entirety by reference.

TECHNICAL FIELD

The present disclosure relates to an information processing apparatus, a storage medium, and a control method.

BACKGROUND

The substrate processing apparatus used for processing a substrate is equipped with, for example, a plurality of physical sensors. The operation of the substrate processing apparatus may be disturbed by an unexpected failure of such a physical sensor installed on the substrate processing apparatus. The abnormality of a physical sensor mounted on the substrate processing apparatus is detected by setting a normal range (bandwidth) for an output value of the physical sensor and comparing the output value with the normal range. In addition, a conventional technique for performing a pre-failure detection has been developed for the semiconductor manufacturing apparatus, such as a heat treatment or film deposition apparatus equipped with multiple physical sensors. This technique calculates virtual sensor data output from a virtual sensor based on a physical model (see, e.g., Japanese Patent Laid-Open Publication No. 2021-132140).

SUMMARY

According to an aspect of the present disclosure, an information processing apparatus includes an acquisition unit that acquires a physical sensor output value output from each of a plurality of physical sensors installed in a substrate processing apparatus; a prediction unit that predicts a virtual sensor output value of a virtual sensor corresponding to a prediction target physical sensor by using a statistical model that is constructed by a statistical technique or a physical model that is constructed by a physical technique, based on the degree of similarity between the physical sensor output value and data learned by the statistical model; an abnormality determination unit that compares the physical sensor output value of the prediction target physical sensor with the virtual sensor output value of the virtual sensor, and determines whether an abnormality occurs in the physical sensor; and an instruction unit that switch from a control based on the physical sensor output value of the prediction target physical sensor to a control based on the virtual sensor output value of the virtual sensor when determined that the abnormality occurs in the physical sensor.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 10 is a functional block diagram of exemplary substrate processing apparatus that controls the degree of opening of an automatic pressure controller based on a physical sensor output value of a pressure sensor.

FIG. 11 is a functional block diagram of exemplary substrate processing apparatus that controls the degree of opening of a valve based on a physical sensor output value of a flow sensor.

DETAILED DESCRIPTION

In the following detailed description, reference is made to the accompanying drawings, which form a part thereof. The illustrative embodiments described in the detailed description, drawings, and claims are not meant to be limiting. Other embodiments may be utilized, and other changes may be made without departing from the spirit or scope of the subject matter presented here.

Embodiments for carrying out the present disclosure are now described with reference to the drawings.

<System Configuration>

Figure 1:
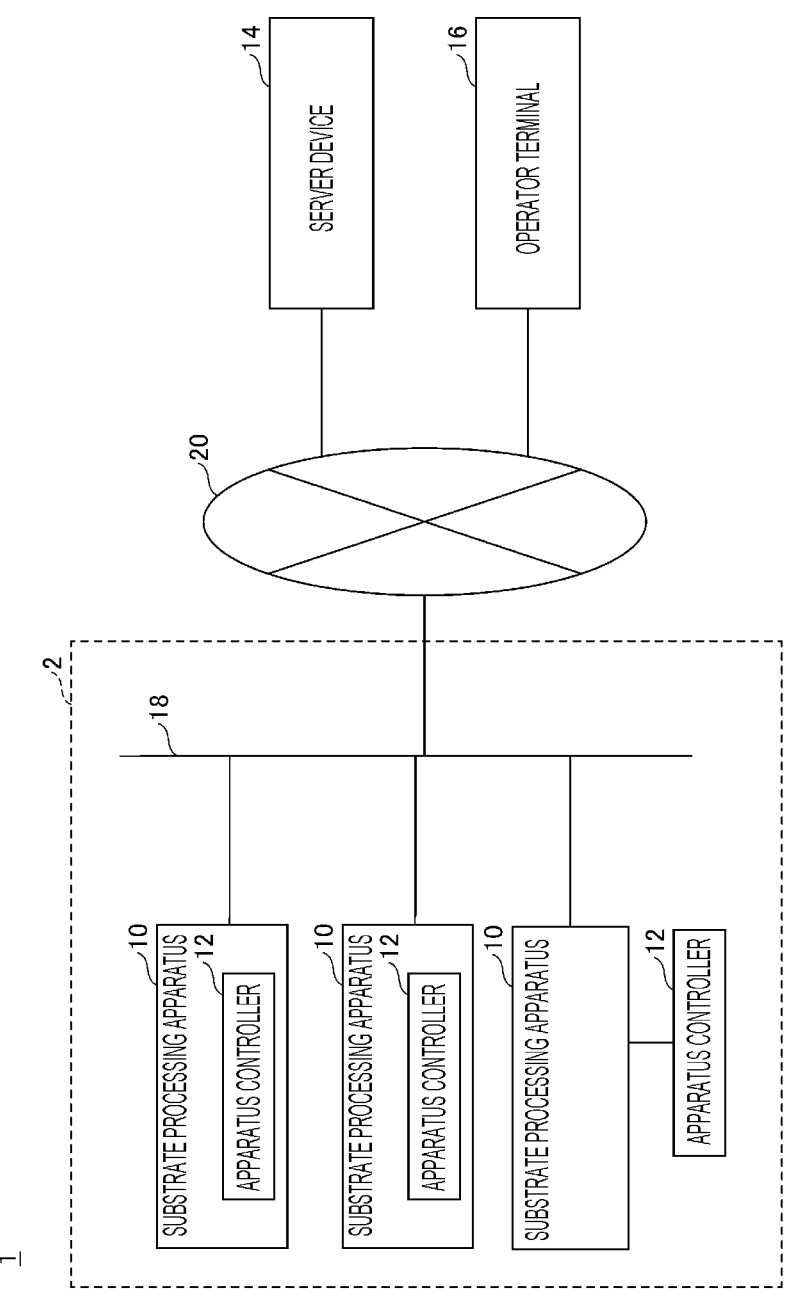
FIG. 1 is a configuration diagram of an exemplary substrate processing system according to the present embodiment.

FIG. 1 is a configuration diagram of an exemplary substrate processing system according to the present embodiment. The substrate processing system 1 illustrated in FIG. 1 has substrate processing apparatus 10, an apparatus controller 12, a server device 14, and an operator terminal 16. The substrate processing apparatus 10 is provided with one or more quantities. The substrate processing apparatus 10 and the apparatus controller 12 are installed in a manufacturing factory 2. The server device 14 and the operator terminal 16 may be installed either within the manufacturing factory 2 or elsewhere other than the manufacturing factory 2. The operator terminal 16 is a device that is operated by an operator or worker, such as personnel responsible for the substrate processing apparatus 10 installed in the manufacturing factory 2 or individuals involved in analysis tasks.

The substrate processing apparatus 10, the apparatus controller 12, the server device 14, and the operator terminal 16 are communicatively interconnected via networks 18 and 20, such as the Internet or a local area network (LAN).

The substrate processing apparatus 10 may be an apparatus capable of performing various substrate processing tasks, such as film deposition, etching, and ashing. The substrate processing apparatus 10 may be used as an apparatus for processing a semiconductor wafer or an apparatus for processing a flat panel display glass substrate. The substrate processing apparatus 10 may also be used as semiconductor manufacturing apparatus, heat treatment apparatus, or film deposition apparatus.

The substrate processing apparatus 10 receives a recipe or macro-based control instruction from the apparatus controller 12 and executes the corresponding recipe or macro-based processing. The substrate processing apparatus 10 executes processing tasks following a sequence, such as a recipe or macro. The substrate processing apparatus 10 is installed with a plurality of physical sensors.

Further, the substrate processing apparatus 10 may be equipped with the apparatus controller 12 as illustrated in FIG. 1, or may not be equipped with the apparatus controller 12 as long as it is communicably connected. The system controller 12 has a computer capable of controlling the substrate processing apparatus 10. The apparatus controller 12 outputs a control instruction, which is used to control components to be controlled by the substrate processing apparatus 10 in accordance with the recipe or macro, to the substrate processing apparatus 10, causing the substrate processing apparatus 10 to execute the recipe or macro-based processing.

The apparatus controller 12 functions as a man-machine interface, which receives an instruction used for the substrate processing apparatus 10 from an operator and provides the operator with information regarding the substrate processing apparatus 10.

The apparatus controller 12 receives a physical sensor output value that is output from each of the physical sensors installed in the substrate processing apparatus 10. Examples of the physical sensor include temperature sensors, pressure sensors, and flow sensors. The apparatus controller 12 compares a prediction target physical sensor output value to a virtual sensor output value to determine whether an abnormality occurs in the prediction target physical sensor. The virtual sensor output value is predicted using either a physical model or a statistical model, which will be further described later.

Further, in the case where the apparatus controller 12 determines that an abnormality occurs in the prediction target physical sensor, the apparatus controller 12 performs a transition for the substrate processing apparatus 10 from control based on the prediction target physical sensor output value to control based on the virtual sensor output value of a virtual sensor corresponding to the prediction target physical sensor.

The server device 14 may receive and store the physical sensor output values output from the multiple physical sensors installed in the substrate processing apparatus 10. Like the apparatus controller 12, the server device 14 may compare the prediction target physical sensor output value to the virtual sensor output value predicted using either a physical or statistical model to be described later and determine whether an abnormality occurs in the prediction target physical sensor. When it is determined that an abnormality occurs in the prediction target physical sensor, the server device 14 may perform a transition for the substrate processing apparatus 10 from control based on the prediction target physical sensor output value to control based on the virtual sensor output value of the virtual sensor corresponding to the prediction target physical sensor.

Further, when it is determined that an abnormality occurs in the prediction target physical sensor, the apparatus controller 12 or the server device 14 may cause relevant information to be displayed on the display of the apparatus controller 12, the display of the server device 14, the display of the operator terminal 16, or similar display devices. This notification is to inform the operator of an abnormality in the physical sensor. When it is determined that an abnormality occurs in the prediction target physical sensor, the apparatus controller 12 or the server device 14 may notify the operator of an abnormality in the physical sensor using e-mail or similar communication methods. As will be described later, the substrate processing system 1 according to the present embodiment implements functionality for detecting abnormalities in a prediction target physical sensor and ensuring redundancy for the prediction target physical sensor. The operator terminal 16 may be a personal computer (PC) or a smartphone operated by an operator or worker such as personnel responsible for the substrate processing apparatus 10 installed in the manufacturing factory 2 or individuals involved in analysis tasks.

The substrate processing system 1 illustrated in FIG. 1 is an example, and it is understood that the possible system configurations vary depending on the application and purpose. For example, the substrate processing system 1 may have various configurations, such as a configuration in which the apparatus controllers 12 for respective substrate processing apparatuses are integrated into an apparatus controller 12 for a plurality of substrate processing apparatuses 10, or a configuration in which the apparatus controllers 12 are further divided.

<Hardware Configuration>

The apparatus controller 12, the server device 14, and the operator terminal 16 of the substrate processing system 1 illustrated in FIG. 1 are implemented using, for example, a computer (an information processing apparatus as defined herein). The exemplary hardware configuration of this computer is illustrated in FIG. 2.

Figure 2:
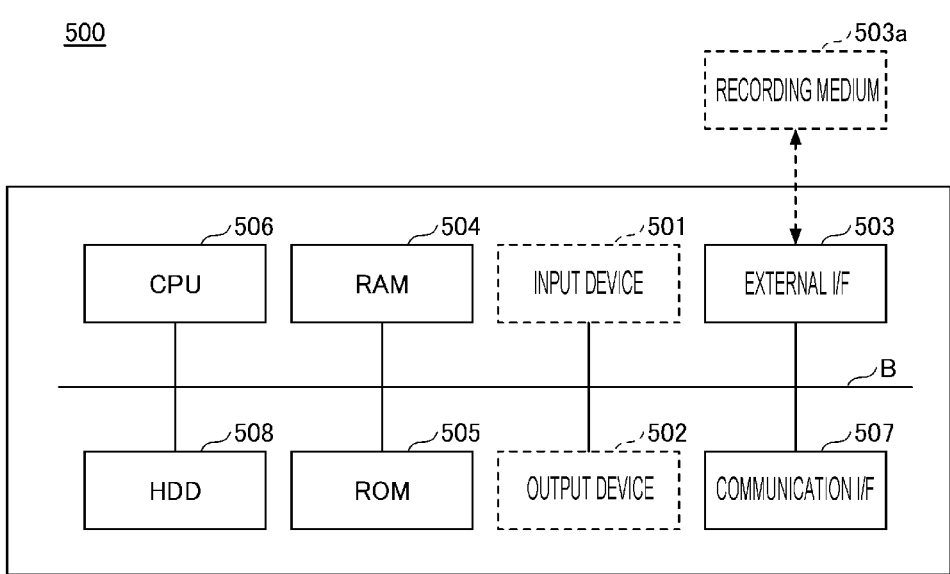
FIG. 2 is a hardware configuration diagram of an exemplary computer.

The computer 500 illustrated in FIG. 2 is provided with various components, including an input device 501, an output device 502, an external interface (I/F) 503, random-access memory (RAM) 504, read-only memory (ROM) 505, a central processing unit (CPU) 506, a communication OF 507, a hard disk drive (HDD) 508, and other devices. The components are interconnected via a bus B. The input device 501 and the output device 502 may be connected for use when necessary.

The input device 501 may be a keyboard, mouse, touch panel, or other similar devices and enables the operator to enter various operation signals. The output device 502 may be a display or other similar devices and presents the result of processing performed by the computer 500. The communication OF 507 is an interface enabling the computer 500 to be connected to the network 18 or 20. The HDD 508 is an exemplary non-volatile storage device that stores programs or data.

The external OF 503 is an interface that enables connection with an external device. The external OF 503 allows the computer 500 to read from and/or write to a recording medium 503a, such as a secure digital (SD) memory card. The ROM 505 is an exemplary non-volatile semiconductor memory (storage device) that stores programs or data. The RAM 504 is an exemplary volatile semiconductor memory (storage device) that temporarily holds programs or data.

The CPU 506 is a processing and computing unit that loads programs or data from the storage device such as the ROM 505 or HDD 508 onto the RAM 504 and executes processing tasks, implementing the overall control and functionality of the computer 500.

The execution of programs on the computer 500 having the hardware configuration illustrated in FIG. 2 allows the apparatus controller 12, the server device 14, and the operator terminal 16 illustrated in FIG. 1 to implement various functions described later.

<Functional Configuration>

Figure 3:
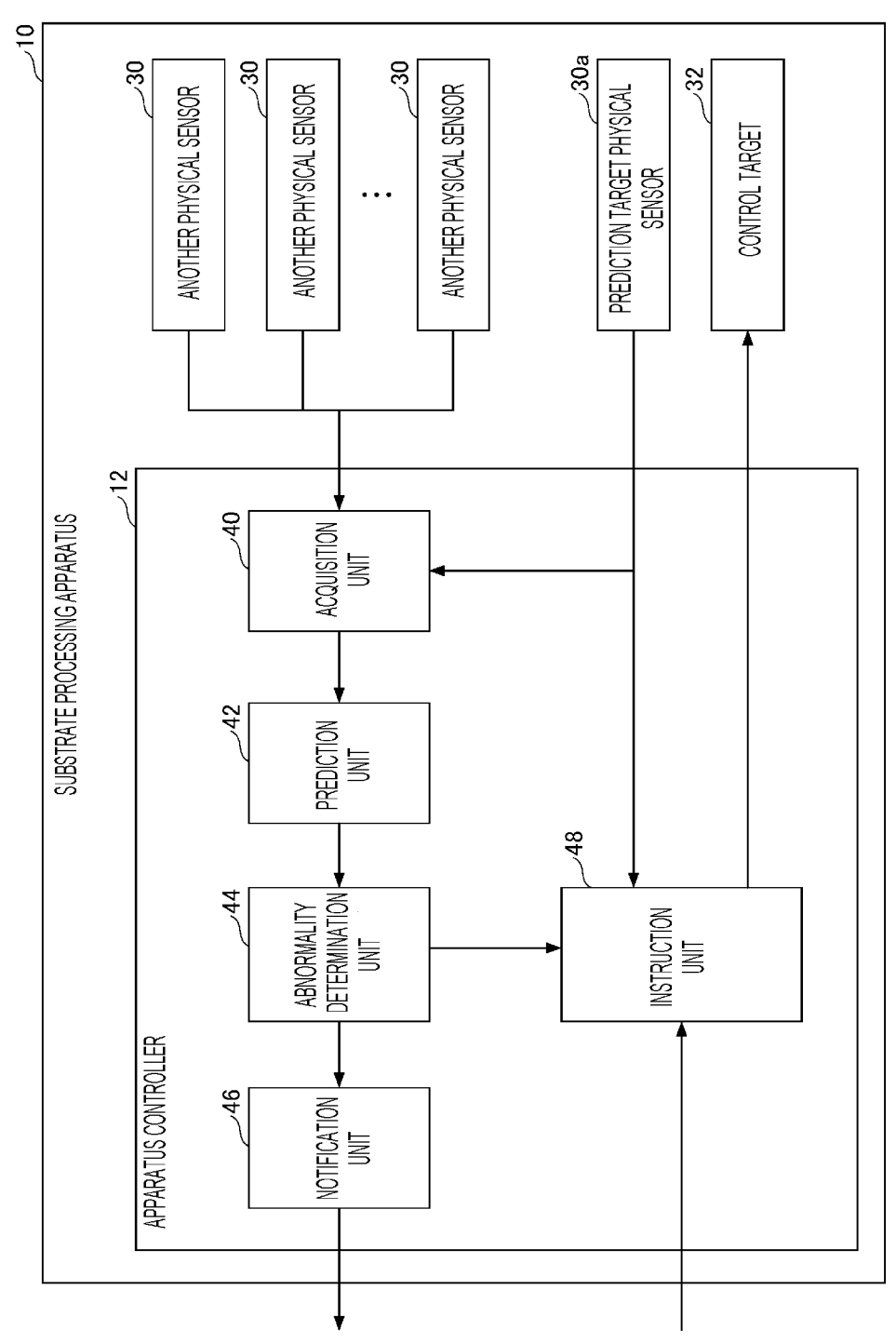
FIG. 3 is a functional block diagram of exemplary substrate processing apparatus according to the present embodiment.

The substrate processing apparatus 10 of the substrate processing system 1 according to the present embodiment is implemented as, for example, functional blocks as illustrated in FIG. 3. FIG. 3 represents a functional block diagram of the exemplary substrate processing apparatus according to the present embodiment. The functional block diagram illustrated in FIG. 3 excludes the illustration of configurations that are not necessarily required to describe the present embodiment.

The apparatus controller 12 of the substrate processing apparatus 10 illustrated in FIG. 3 implements an acquisition unit 40, a prediction unit 42, an abnormality determination unit 44, a notification unit 46, and an instruction unit 48 by executing a program for the apparatus controller 12.

The substrate processing apparatus 10 is permanently installed with a prediction target physical sensor 30a, which is a physical sensor used to detect an abnormality. The term "permanently installed" used herein indicates that the sensor is installed, for example, in a manufactured product from manufacture, rather than as part of a trial installation. The other physical sensor 30 is permanently installed in the substrate processing apparatus 10 and used to predict the virtual sensor output value of a virtual sensor corresponding to the prediction target physical sensor 30a. The other physical sensor 30 preferably exhibits a high correlation with the physical sensor output value of the prediction target physical sensor 30a, surpassing a specified threshold.

The prediction target physical sensor 30a may also be used as the other physical sensor 30 for a separate prediction target physical sensor 30a. The other physical sensor 30 may also be used as the separate prediction target physical sensor 30a.

The acquisition unit 40 of the apparatus controller 12 acquires the physical sensor output values output from the other physical sensor 30 and the prediction target physical sensor 30a. The prediction unit 42 has a function of predicting the physical sensor output value of the prediction target physical sensor 30a based on the physical sensor output value of the other physical sensor 30. In the present embodiment, the physical sensor output value of the prediction target physical sensor 30a predicted by the prediction unit 42 is referred to as the virtual sensor output value of the virtual sensor corresponding to the prediction target physical sensor 30a. Further details regarding the processing performed by the prediction unit 42 will be described later.

The abnormality determination unit 44 compares the physical sensor output value of the prediction target physical sensor 30a with the virtual sensor output value of the virtual sensor corresponding to the prediction target physical sensor 30a. The abnormality determination unit 44 determines whether an abnormality occurs in the prediction target physical sensor 30a based on this comparison. In one example, when the difference between the physical sensor output value of the prediction target physical sensor 30a and the virtual sensor output value of the virtual sensor corresponding to the prediction target physical sensor 30a is greater than or equal to a predetermined value, the abnormality determination unit 44 determines that an abnormality occurs in the prediction target physical sensor 30a. Subsequently, the abnormality determination unit 44 transmits information indicating the existence of an abnormality in the prediction target physical sensor 30a to both the notification unit 46 and the instruction unit 48.

The notification unit 46, when receiving the information indicating that an abnormality occurs in the prediction target physical sensor 30a from the abnormality determination unit 44, issues a warning or reports an abnormality to notify the operator of an abnormality in the prediction target physical sensor 30a. The notification to the operator may be performed by displaying on a display, sending via e-mail, turning on a light outputting as sound, or printing out.

The instruction unit 48 receives the information indicating the existence of an abnormality in the prediction target physical sensor 30a from the abnormality determination unit 44. when the instruction unit 48 does not receive the information indicating the occurrence of an abnormality in the prediction target physical sensor 30a, the instruction unit 48 performs a recipe or macro-based control on a control target 32 based on the physical sensor output value of the prediction target physical sensor 30a.

Upon receiving the information indicating the occurrence of an abnormality in the prediction target physical sensor 30a, the instruction unit 48 performs a transition for the control target 32 from control based on the physical sensor output value of the prediction target physical sensor 30a to control based on the virtual sensor output value of the virtual sensor corresponding to the prediction target physical sensor 30a. In other words, upon receiving the information indicating the occurrence of an abnormality in the prediction target physical sensor 30a, the instruction unit 48 performs the recipe or macro-based control on the control target 32 based on the virtual sensor output value of the virtual sensor.

As described above, in the substrate processing apparatus 10 according to the present embodiment, when an abnormality is detected in the prediction target physical sensor 30a, a redundancy running or operation may be performed by substituting it with the virtual sensor output value of the virtual sensor corresponding to the prediction target physical sensor 30a, instead of the prediction target physical sensor 30a.

Thus, in the substrate processing apparatus 10 according to the present embodiment, even when the prediction target physical sensor 30a fails during the process, it is possible to use the virtual sensor corresponding to the prediction target physical sensor 30a as a substitute. This enables the control of the control target 32 to be maintained, preventing issues such as lotting out of a semiconductor wafer. Additionally, in the substrate processing apparatus 10 according to the present embodiment, even when the prediction target physical sensor 30a fails during the process, it is possible to use a virtual sensor corresponding to the prediction target physical sensor 30a as a substitute until the prediction target physical sensor 30a may be replaced, improving the operating rate of the substrate processing apparatus 10.

Figure 4:
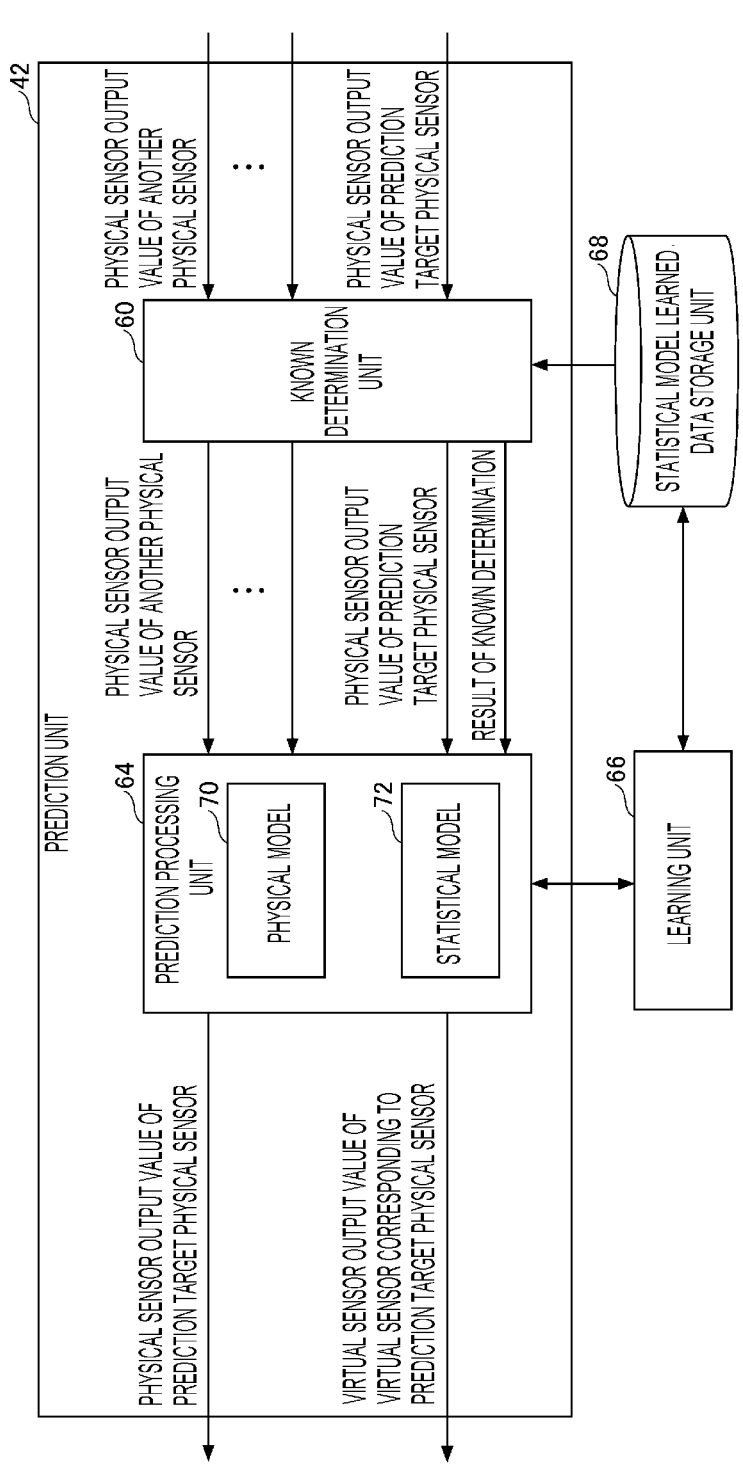
FIG. 4 is a functional block diagram of an exemplary prediction unit according to the present embodiment.

The prediction unit 42 is implemented as, for example, functional blocks illustrated in FIG. 4. FIG. 4 is a functional block diagram of an exemplary prediction unit according to the present embodiment. The functional block diagram illustrated in FIG. 4 excludes the illustration of configurations that are not necessarily required to describe the present embodiment.

The prediction unit 42 illustrated in FIG. 4 has a configuration including a known determination unit 60 and a prediction processing unit 64. The prediction processing unit 64 has a physical model 70 and a statistical model 72. In addition, FIG. 4 illustrates an instance where a learning unit 66 and a statistical model-learned data storage unit 68 are provided separately from the prediction unit 42. However, the learning unit 66 and the statistical model-learned data storage unit 68 may be provided within the prediction unit 42.

The physical model 70 is a predictive model constructed using physical techniques. The physical model 70 relies on fundamental physical and scientific laws, allowing for the prediction of the behavior of the prediction target physical sensor 30a in accordance with rules and principles. Accordingly, the physical model 70 may maintain a certain level of prediction accuracy for the analyzed known data.

However, highly accurate prediction equivalent to the target physical sensor 30a using the physical model 70 is challenging when relying solely on known data, and it takes time to construct a model and tune an unknown phenomenon that has not been analyzed.

The statistical model 72 is a predictive model constructed by statistical techniques. The statistical model 72 is constructed based on log data of the substrate processing apparatus 10 using common estimation algorithms such as Gaussian process regression models or neural networks. In one example, the log data of the substrate processing apparatus 10 allows for the calculation of the other physical sensor 30 that exhibits a high correlation with the prediction target physical sensor 30a. The statistical model 72 has learned log data of the physical sensor output value of the other physical sensor 30 that exhibits a high correlation with the prediction target physical sensor 30a. This enables the statistical model 72 to make more accurate predictions compared to the physical model 70 when applied to known data. However, the statistical model 72 encounters a challenge in predicting unknown data.

Thus, the prediction unit 42 according to the present embodiment uses a combination of the statistical model 72 capable of highly accurate prediction of known behavior and the physical model 70 capable of coping with unknown behavior within the assumption. This implementation results in a virtual sensor function that exhibits flexibility in responding to a wide range of conditions.

The statistical model-learned data storage unit 68 stores the known data learned by the statistical model 72. The known determination unit 60 determines whether the physical sensor output value of the prediction target physical sensor 30a is known data based on the degree of similarity or resemblance between the physical sensor output value of the prediction target physical sensor 30a and the known data learned by the statistical model 72. The known determination unit 60 then notifies the prediction processing unit 64 of the result of the known determination.

When the result of the known determination indicates that the physical sensor output value of the prediction target physical sensor 30a is known data, the prediction processing unit 64 uses the statistical model 72 to predict the virtual sensor output value of the virtual sensor corresponding to the prediction target physical sensor 30a. When the result of the known determination indicates that the physical sensor output value of the prediction target physical sensor 30a is not the known data, the prediction processing unit 64 uses the physical model 70 to predict the virtual sensor output value of the virtual sensor corresponding to the prediction target physical sensor 30a.

Predicting unknown data not included within the assumption remains challenging even when using the physical model 70. As a solution, the learning unit 66 causes the statistical model 72 to additionally learn unknown data. By undergoing this additional learning, previously unknown data becomes known data learned by the statistical model 72, enabling highly accurate predictions using the statistical model 72.

The additional learning for the statistical model 72 caused by the learning unit 66 may have various timings. In one example, the additional learning for the statistical model 72 may be performed at different timings, such as every predetermined interval, when encountering unknown data, after completing a recipe or macro-based process (or run), or during the execution of a recipe or macro-based process. The learning unit 66 may set up the statistical model 72 for additional learning, cause the statistical model 72 to additionally learn, and then update the statistical model 72 being operated by the prediction processing unit 64.

<Processing>

Figure 5:
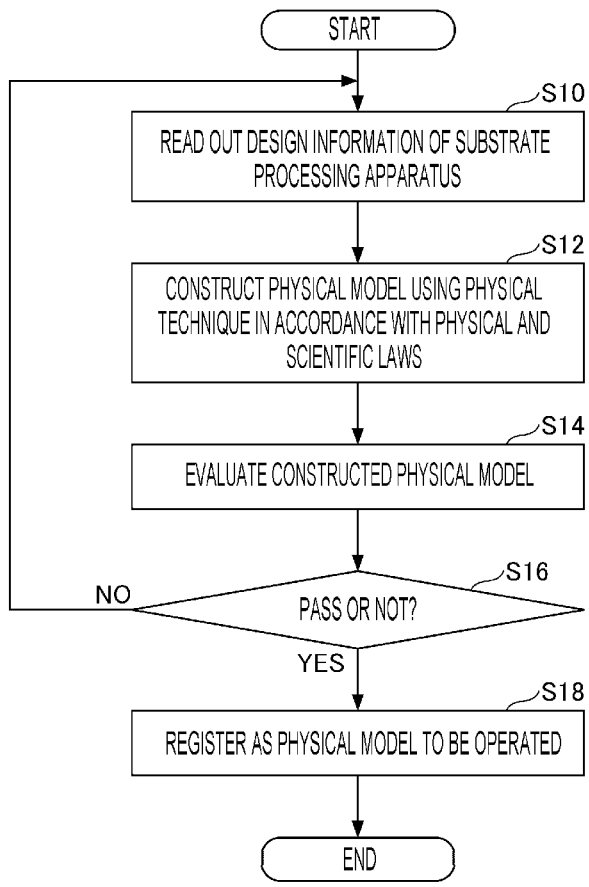
FIG. 5 is a flowchart illustrating an exemplary procedure for creating a physical model.

The substrate processing apparatus 10 according to the present embodiment creates a physical model 70, for example, following the procedure illustrated in FIG. 5. FIG. 5 is a flowchart illustrating an exemplary procedure for creating a physical model. The physical model 70 may be created, for example, by the server device 14 and registered in the substrate processing apparatus 10, or alternatively may be created by the apparatus controller 12. An exemplary procedure performed by the server device 14 is described below.

In step S10, the server device 14 reads out design information of the substrate processing apparatus 10 from the storage unit where the design information is stored. The design information of the substrate processing apparatus 10 may be stored within the server device 14 or stored elsewhere other than the server device 14.

In step S12, the server device 14 constructs a physical model using a physical technique in accordance with physical and scientific laws. In step S14, the server device 14 evaluates the physical model constructed in step S12 using an existing evaluation method. When the result of the evaluation in step S14 does not get a pass, the server device 14 returns to step S10 and continues processing. When the result of the evaluation in step S14 gets a pass, the server device 14 proceeds to step S18 and registers the physical model, which passed the result of the evaluation in step S14, in the prediction unit 42 of the apparatus controller 12 as the physical model to be operated.

Figure 6:
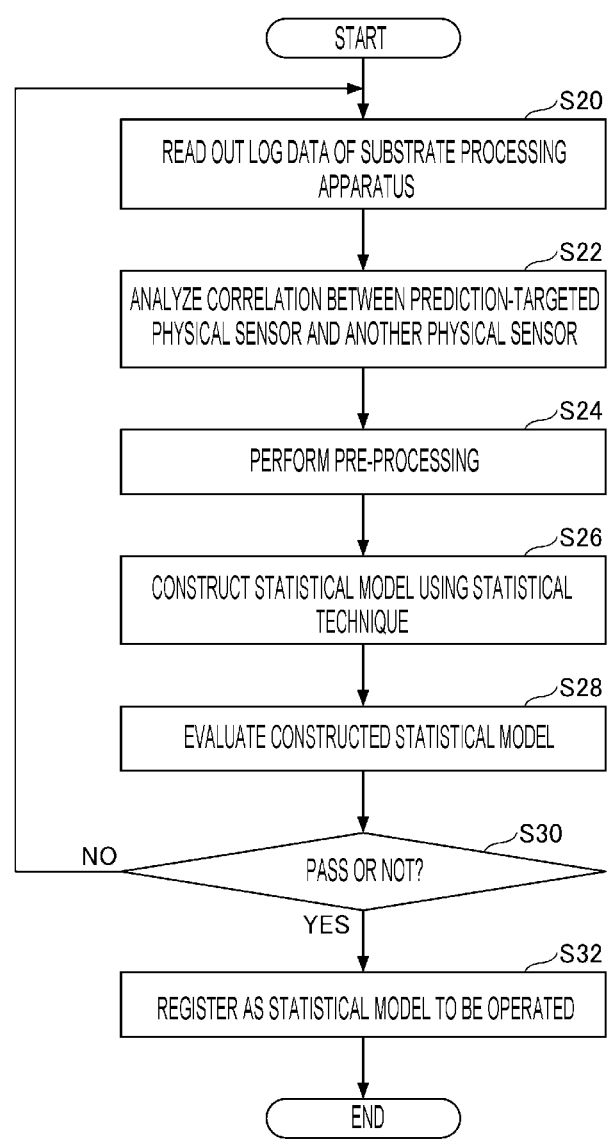
FIG. 6 is a flowchart illustrating an exemplary procedure for creating a statistical model.

The substrate processing apparatus 10 according to the present embodiment creates the statistical model 72, for example, following the procedure illustrated in FIG. 6. FIG. 6 is a flowchart illustrating an exemplary procedure for creating a statistical model. The statistical model 72 may be created, for example, by the server device 14 and registered in the substrate processing apparatus 10, or alternatively may be created by the apparatus controller 12. An exemplary procedure performed by the server device 14 is described below.

In step S20, the server device 14 reads out the log data of the substrate processing apparatus 10 from the storage unit in which the log data of the substrate processing apparatus 10 is stored. The log data of the substrate processing apparatus 10 may be stored inside the substrate processing apparatus 10, inside the server device 14, or stored elsewhere. The log data includes the physical sensor output values output from the prediction target physical sensor 30a and the other physical sensor 30, as well as the behavior of the physical sensor output values.

In step S22, the server device 14 analyzes the correlation between the prediction target physical sensor 30a and the other physical sensor 30 and calculates the other physical sensor 30 that exhibits a correlation higher than a threshold with the prediction target physical sensor 30*a*. In step S24, the server device 14 reads out the physical sensor output value of the other physical sensor 30 that exhibits a correlation higher than a threshold with the prediction target physical sensor 30*a* and the behavior of the physical sensor output value from the log data, and performs necessary preprocessing.

In step S26, the server device 14 constructs a statistical model using a statistical technique based on the physical sensor output value of the other physical sensor 30 that exhibits a correlation higher than a threshold with the prediction target physical sensor 30*a* and the behavior of the physical sensor output value. In step S28, the server device 14 evaluates the statistical model constructed in step S26 using an existing evaluation method. When the result of the evaluation in step S28 does not get a pass, the server device 14 returns to step S20 and continues processing. Meanwhile, when the result of the evaluation in step S28 gets a pass, the server device 14 proceeds to step S32 and registers the statistical model that passed the result of the evaluation in step S28 in the prediction unit 42 of the apparatus controller 12 as a statistical model to be operated.

Figure 7:
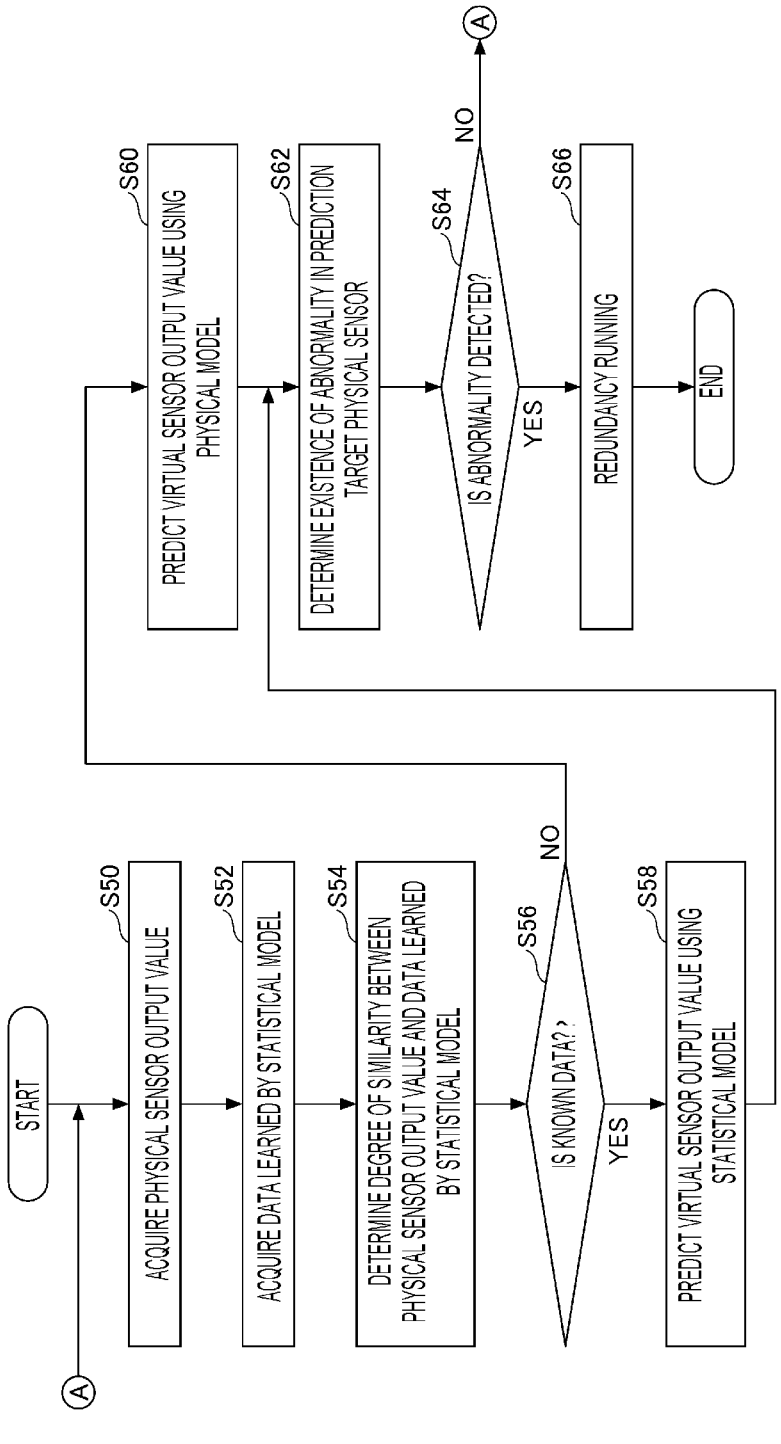
FIG. 7 is a flowchart illustrating an exemplary procedure for detecting abnormalities and implementing redundancies of a prediction target physical sensor.

In one example, as illustrated in FIG. 7, the substrate processing apparatus 10 according to the present embodiment performs the detection of an abnormality for the prediction target physical sensor 30*a* and the implementation of redundancy for the prediction target physical sensor 30*a*. FIG. 7 is a flowchart illustrating an exemplary procedure for the abnormality detection and redundancy implementation for a prediction target physical sensor.

In step S50, the acquisition unit 40 of the apparatus controller 12 acquires the physical sensor output values output from the other physical sensor 30 and the prediction target physical sensor 30*a* and transmits them to the known determination unit 60 of the prediction unit 42. In step S52, the known determination unit 60 of the prediction unit 42 acquires the data learned by the statistical model 72 from the statistical model-learned data storage unit 68.

In step S54, the known determination unit 60 determines the degree of similarity between the physical sensor output value of the prediction target physical sensor 30*a*, which is acquired in step S50 and the data learned by the statistical model 72, which is acquired in step S52. The degree of similarity between the physical sensor output value of the prediction target physical sensor 30*a* and the data learned by the statistical model 72 represents the degree of similarity between the data of an explanatory variable learned previously by the statistical model 72 and the data of the explanatory variable to be used for the current prediction by the prediction processing unit 64. The known determination unit 60 checks whether the data of the explanatory variable to be used for the current prediction by the prediction processing unit 64 is included in the data of the explanatory variable learned previously by the statistical model 72. Alternatively, the known determination unit 60 checks whether the behavior of the data of the explanatory variable to be used for the current prediction by the prediction processing unit 64 is included in the behavior of the data of the explanatory variables learned previously by the statistical model 72. This allows the known determination unit 60 to determine the degree of similarity. The degree of similarity may be determined by using the cosine similarity of a predetermined interval before the prediction point.

In step S56, the known determination unit 60 determines whether the physical sensor output value of the prediction target physical sensor 30*a* is known data. This determination is performed based on the degree of similarity between the physical sensor output value of the prediction target physical sensor 30*a* and the data learned by the statistical model 72. Subsequently, the known determination unit 60 notifies the prediction processing unit 64 of the result of the known determination.

When the physical sensor output value of the prediction target physical sensor 30*a* is known data, the prediction processing unit 64 proceeds to step S58, and predicts the virtual sensor output value of the virtual sensor corresponding to the prediction target physical sensor 30*a* using the statistical model 72. Meanwhile, when the physical sensor output value of the prediction target physical sensor 30*a* is not the known data, the prediction processing unit 64 proceeds to step S60, and predicts the virtual sensor output value of the virtual sensor corresponding to the prediction target physical sensor 30*a* using the physical model 70.

Proceeding to step S62 following step S58 or S60, the abnormality determination unit 44 compares the physical sensor output value of the prediction target physical sensor 30*a* with the virtual sensor output value of the virtual sensor corresponding to the prediction target physical sensor 30*a* to determine whether an abnormality occurs in the prediction target physical sensor 30*a*.

Figure 8:
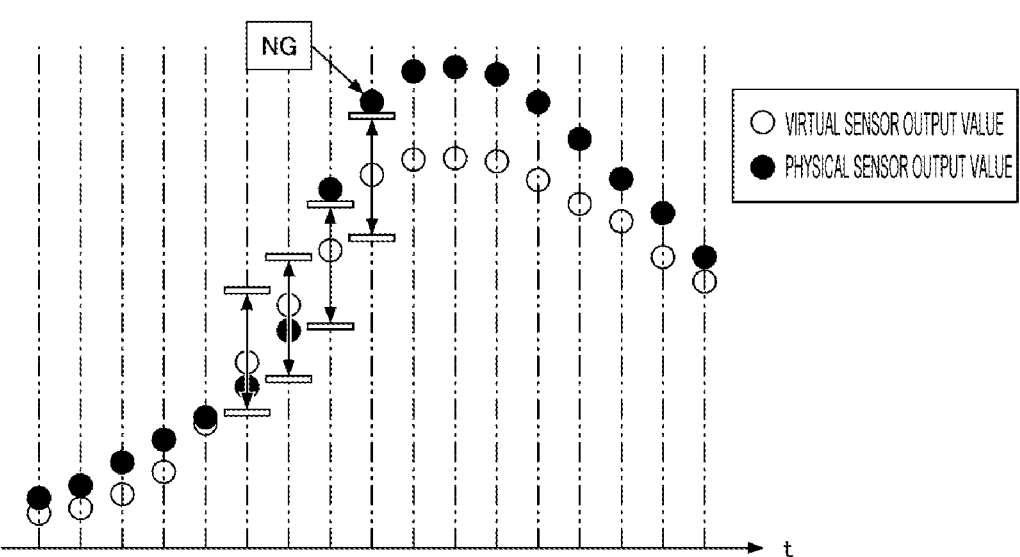
FIG. 8 is a diagram illustrating, as an image, exemplary processing for detecting abnormalities of a prediction target physical sensor.

In one example, the abnormality determination unit 44 uses the physical sensor output value of the prediction target physical sensor 30*a* and the virtual sensor output value of the virtual sensor corresponding to the prediction target physical sensor 30*a*, as illustrated in FIG. 8, to determine whether an abnormality occurs in the physical sensor 30*a*.

FIG. 8 is a diagram illustrating, as an image, exemplary processing for detecting an abnormality in the prediction target physical sensor. In FIG. 8, the virtual sensor output value of the virtual sensor is represented by the graphical symbol "○," and the physical sensor output value of the prediction target physical sensor 30*a* is represented by the graphical symbol "●." The abnormality determination unit 44 sets a normal range (bandwidth) based on the virtual sensor output value of the virtual sensor. When any point "●" of the physical sensor output value falls outside the bandwidth, the abnormality determination unit 44 determines that an abnormality occurs in the prediction target physical sensor 30*a*.

In this way, when the difference between the physical sensor output value of the prediction target physical sensor 30*a* and the virtual sensor output value of the virtual sensor corresponding to the prediction target physical sensor 30*a* is greater than or equal to a predetermined value, the abnormality determination unit 44 determines that an abnormality occurs in the prediction target physical sensor 30*a*. The virtual sensor output value of the virtual sensor corresponding to the prediction target physical sensor 30*a* is treated as the ideal physical sensor output value of the prediction target physical sensor 30*a*.

Upon detecting an abnormality in the prediction target physical sensor 30*a*, the abnormality determination unit 44 notifies the instruction unit 48 that an abnormality occurs in the prediction target physical sensor 30*a*. In step S66, the instruction unit 48 performs a transition for the control target 32 from control based on the physical sensor output value of the prediction target physical sensor 30*a* to control based on the virtual sensor output value of the virtual sensor corresponding to the prediction target physical sensor 30*a*.

Thus, upon receiving information indicating the occurrence of an abnormality in the prediction target physical sensor 30*a*, the instruction unit 48 controls the control target 32 based on the virtual sensor output value of the virtual sensor, implementing redundancy running.

When the instruction unit 48 does not receive information indicating the occurrence of an abnormality in the prediction target physical sensor 30a, the instruction unit 48 controls the control target 32 based on the physical sensor output value of the prediction target physical sensor 30a.

Figure 9:
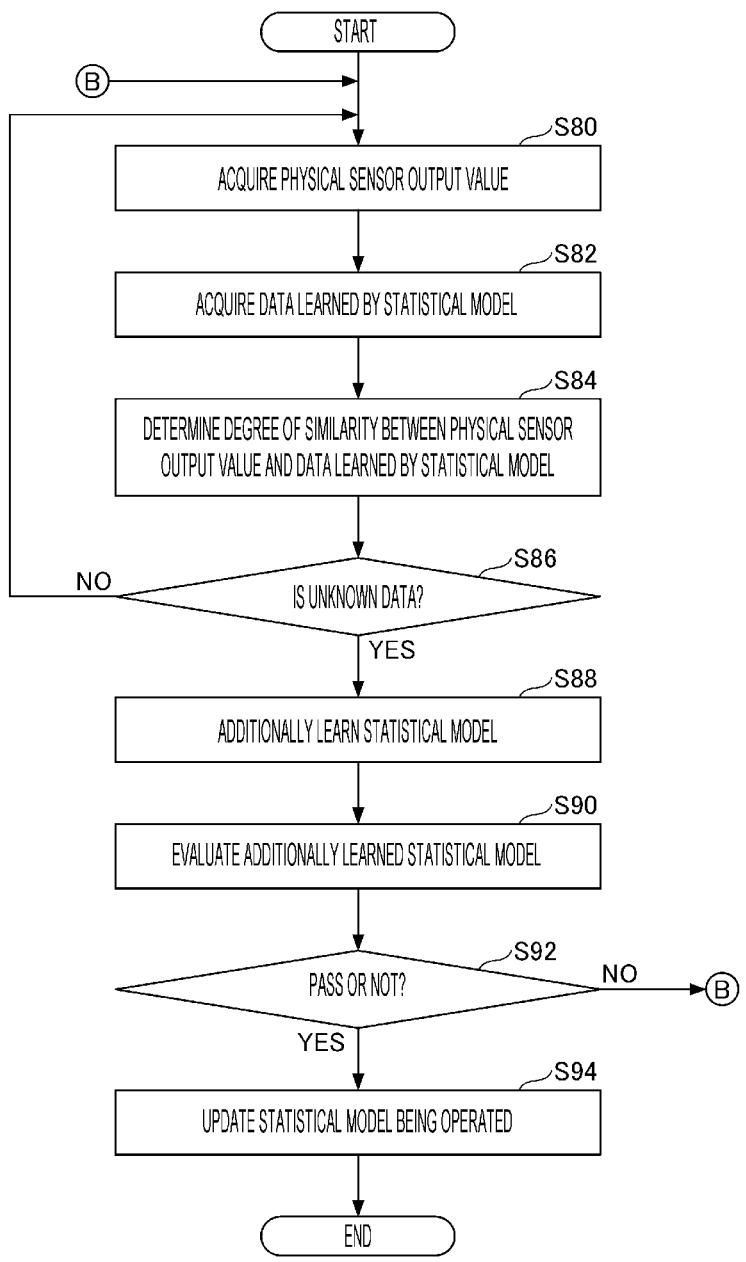
FIG. 9 is a flowchart illustrating an exemplary procedure for additional learning of a statistical model.

The prediction unit 42 causes the statistical model 72 to additionally learn unknown data, for example, as illustrated in the procedure of FIG. 9. FIG. 9 is a flowchart illustrating the exemplary procedure for additional learning to be learned by the statistical model.

In step S80, the acquisition unit 40 of the apparatus controller 12 acquires the physical sensor output values that are output from the other physical sensor 30 and the prediction target physical sensor 30a, and transmits them to the known determination unit 60 of the prediction unit 42. In step S82, the known determination unit 60 of the prediction unit 42 acquires the data learned by the statistical model 72 from the statistical model-learned data storage unit 68.

In step S84, the known determination unit 60 determines the degree of similarity between the physical sensor output value of the prediction target physical sensor 30a acquired in step S80 and the learned data of the statistical model 72 acquired in step S82.

In step S86, the known determination unit 60 determines whether the physical sensor output value of the prediction target physical sensor 30a is known data. This determination is performed based on the degree of similarity between the physical sensor output value of the prediction target physical sensor 30a and the data learned by the statistical model 72. Subsequently, the known determination unit 60 notifies the prediction processing unit 64 of the result of the known determination.

When the physical sensor output value of the prediction target physical sensor 30a is the known data, the prediction processing unit 64 returns to step S80. When the physical sensor output value of the prediction target physical sensor 30a is the unknown data, the learning unit 66 proceeds to step S88 and causes the statistical model 72 to additionally learn the physical sensor output value of the prediction target physical sensor 30a.

In step S90, the learning unit 66 evaluates the statistical model 72 that has additionally learned in step S88 using an existing evaluation method. When the result of the evaluation in step S90 does not get a pass, the learning unit 66 returns to step S80 and continues the processing. Meanwhile, when the result of the evaluation in step S90 gets a pass, the learning unit 66 proceeds to step S94 and registers the statistical model 72, which has additionally learned, in the prediction processing unit 64 as a statistical model to be operated.

As described above, in the present embodiment, when the physical sensor output value of the prediction target physical sensor 30a is the unknown data, the statistical model 72 being used in the prediction unit 42 is caused to be additionally learned, thereby augmenting the known data. This enables the implementation of a prediction model capable of adapting to temporal variations.

Figure 10:
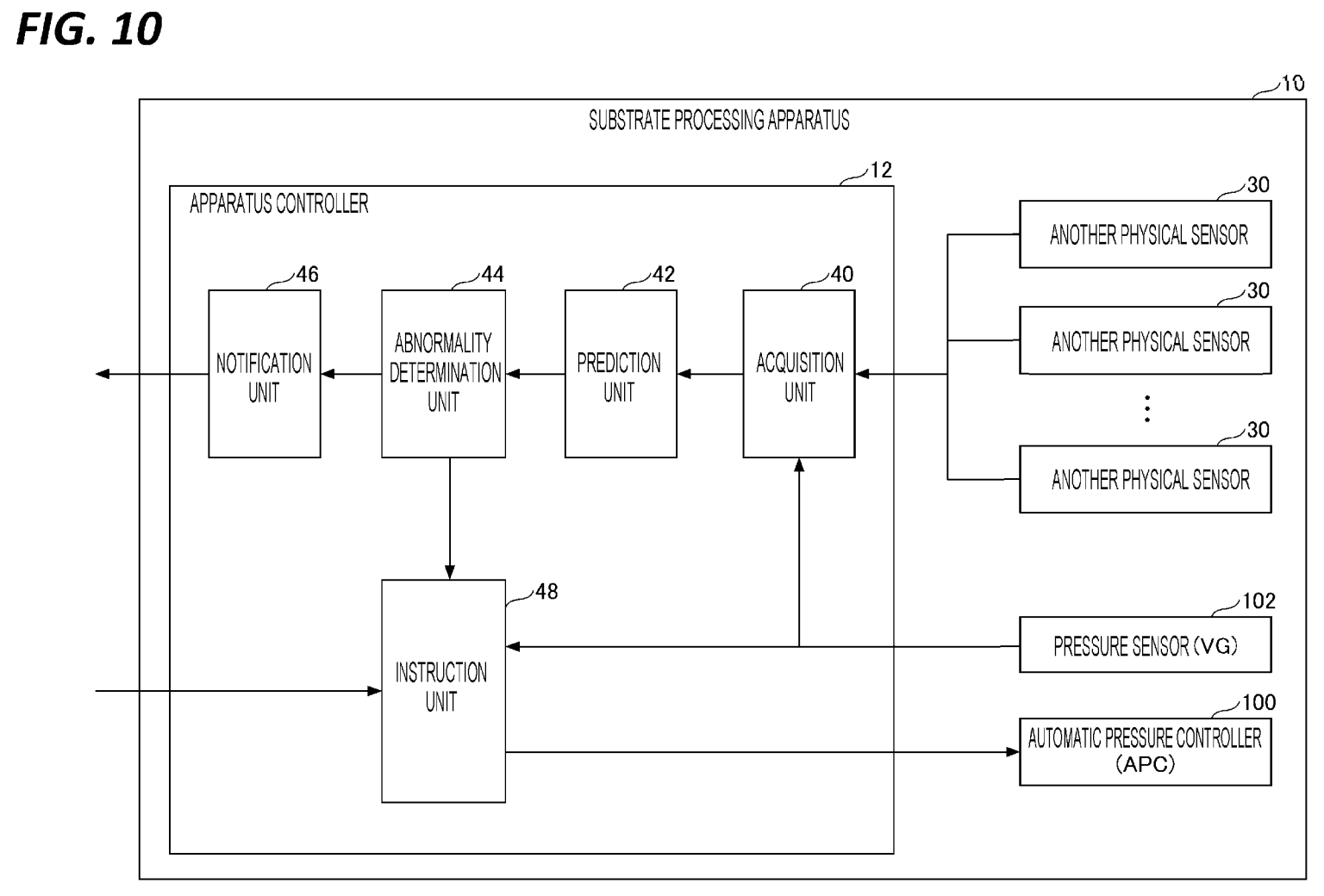

According to the present embodiment, a control method is applicable to the substrate processing apparatus 10 that controls the degree of opening of an automatic pressure controller 100, based on the physical sensor output value of a pressure sensor 102, for example, as illustrated in FIG. 10. FIG. 10 is a functional block diagram of exemplary substrate processing apparatus that controls the degree of opening of an automatic pressure controller based on the physical sensor output value of a pressure sensor.

In the substrate processing apparatus 10 illustrated in FIG. 10, the physical sensor output value of the pressure sensor 102 is compared to the virtual sensor output value of the virtual sensor corresponding to the pressure sensor 102 to determine whether an abnormality occurs in the pressure sensor 102. When it is determined that an abnormality occurs in the pressure sensor 102, the substrate processing apparatus 10 performs a transition for the automatic pressure controller 100 from control based on the physical sensor output value of the pressure sensor 102 to control based on the virtual sensor output value of the virtual sensor corresponding to the pressure sensor 102. In this way, upon receiving information indicating the occurrence of an abnormality in the pressure sensor 102, the instruction unit 48 is capable of controlling the automatic pressure controller 100 in accordance with the recipe or macro based on the virtual sensor output value of the virtual sensor corresponding to the pressure sensor 102.

Figure 11:
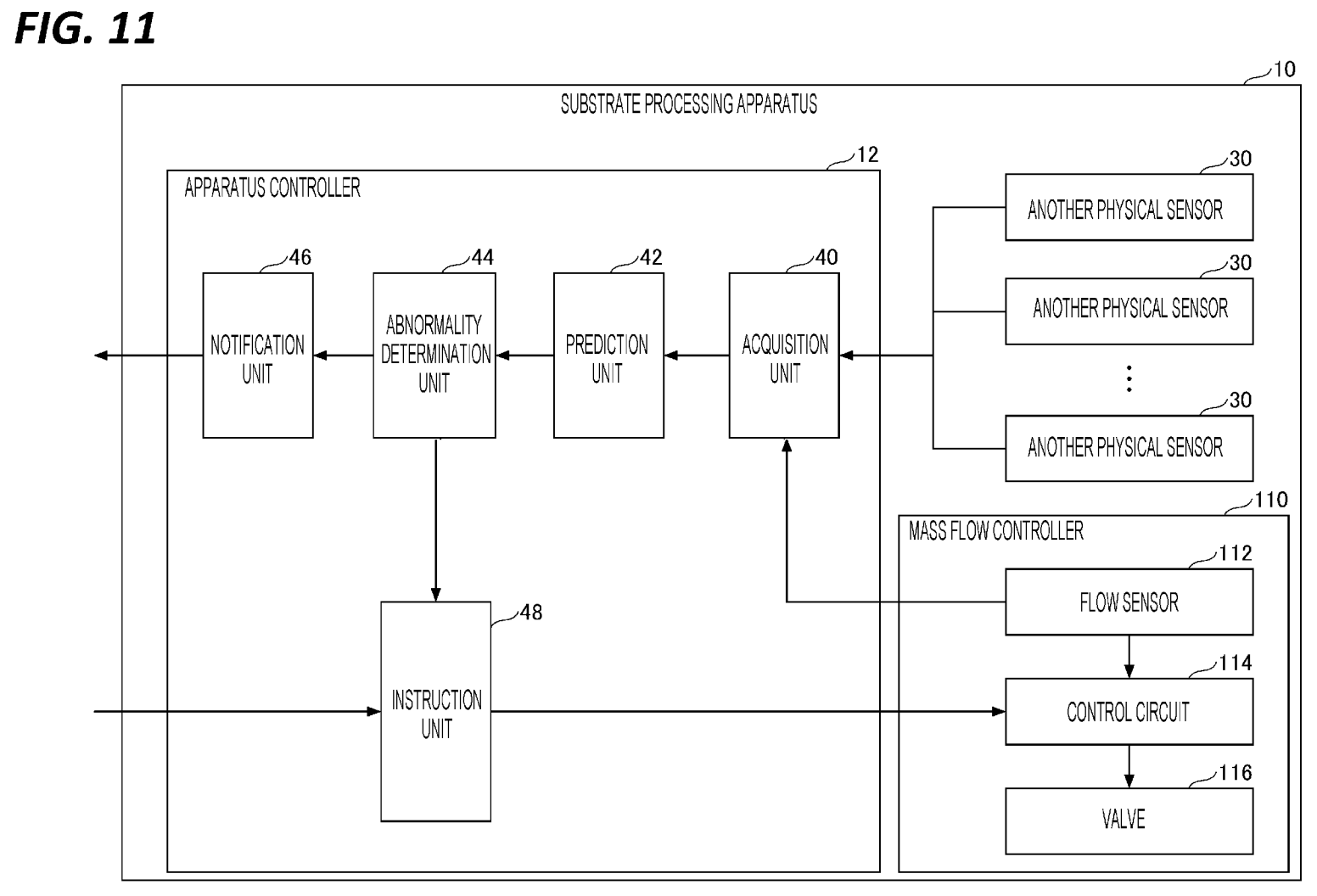

The control method according to the present embodiment is applicable, for example, to the substrate processing apparatus 10 that controls the degree of opening of a valve 116 based on the physical sensor output value of a flow sensor 112 of a mass flow controller 110, as illustrated in FIG. 11. FIG. 11 is a functional block diagram of exemplary substrate processing apparatus that controls the degree of opening of a valve based on the physical sensor output value of a flow sensor.

In the substrate processing apparatus 10 illustrated in FIG. 11, when an abnormality does not occur in the flow sensor 112, the instruction unit 48 of the apparatus controller 12 transmits a flow rate setting value to the mass flow controller 110. In the mass flow controller 110, a control circuit 114 controls the degree of opening of the valve 116 based on the flow rate setting value received from the instruction unit 48 and the physical sensor output value of the flow sensor 112.

Thus, upon the occurrence of an abnormality in the flow sensor 112, the control circuit 114 fails to control the degree of opening of the valve 116 to maintain an appropriate flow rate. In the substrate processing apparatus 10 illustrated in FIG. 11, the physical sensor output value of the flow sensor 112 is compared to the virtual sensor output value of the virtual sensor corresponding to the flow sensor 112 to determine whether an abnormality occurs in the flow sensor 112. In the substrate processing apparatus 10 illustrated in FIG. 11, when it is determined that an abnormality occurs in the flow sensor 112, the instruction unit 48 of the apparatus controller 12 transmits the opening degree setting value of the valve 116 to the mass flow controller 110 to maintain an appropriate flow rate. The relationship between the virtual sensor output value of the virtual sensor corresponding to the flow sensor 112 and the opening degree setting value of the valve 116 is considered to be registered in the apparatus controller 12 in advance.

Upon receiving the information indicating the occurrence of an abnormality in the flow sensor 112, the instruction unit 48 performs a transition for the degree of opening of the valve 116 from control based on the physical sensor output value of the flow sensor 112 to control based on the virtual sensor output value of the virtual sensor corresponding to the flow sensor 112.

The present embodiment enables effective handling of a sudden failure, such as when the output of the physical sensor output value from the prediction target physical sensor 30a stops or a failure in which the physical sensor output value deviates from a theoretical value.

The present disclosure provides technology capable of reducing the operational impact caused by any failures in multiple physical sensors installed in the substrate processing apparatus.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An information processing apparatus comprising:
an acquisition circuitry configured to acquire a physical sensor output value output from each of a plurality of physical sensors installed in a substrate processing apparatus;
a prediction circuitry configured to predict a virtual sensor output value of a virtual sensor corresponding to a prediction target physical sensor among the plurality of physical sensors by using a statistical model that is constructed by a statistical technique or a physical model that is constructed by a physical technique, based on a degree of similarity between the physical sensor output value of the prediction target physical sensor and data learned by the statistical model;
an abnormality determination circuitry configured to compare the physical sensor output value of the prediction target physical sensor with the virtual sensor output value of the virtual sensor, and to determine whether an abnormality occurs in the prediction target physical sensor; and
an instruction circuitry configured to switch from control of the substrate processing apparatus based on the physical sensor output value of the prediction target physical sensor to control of the substrate processing apparatus based on the virtual sensor output value of the virtual sensor when it is determined that the abnormality occurs in the prediction target physical sensor;
wherein the prediction circuitry is configured to predict the virtual sensor output value of the virtual sensor using the statistical model when the degree of similarity is higher than a threshold value, and predicts the virtual sensor output value of the virtual sensor using the physical model when the degree of similarity is equal to or lower than the threshold value.

2. The information processing apparatus according to claim 1, further comprising:
a learning circuitry configured to additionally learn the statistical model using the prediction target physical sensor output value when the degree of similarity is equal to or lower than the threshold value.

3. The information processing apparatus according to claim 1, wherein the prediction circuitry is configured to predict the virtual sensor output value of the virtual sensor from a physical sensor output value of a physical sensor among the plurality of physical sensors that is different from the prediction target physical sensor and exhibits a higher correlation value with respect to the prediction target physical sensor than a threshold value.

4. The information processing apparatus according to claim 1, further comprising:
a notification circuitry configured to, when determined that the abnormality occurs in the prediction target physical sensor, notify an operator of the abnormality in the physical sensor.

5. A non-transitory computer-readable storage medium having stored therein a program that, when executed, causes a computer to execute a process performed by an information processing apparatus, the process comprising:
acquiring a physical sensor output value output from each of a plurality of physical sensors installed in a substrate processing apparatus;
predicting a virtual sensor output value of a virtual sensor corresponding to a prediction target physical sensor among the plurality of physical sensors by using a statistical model that is constructed by a statistical technique or a physical model that is constructed by a physical technique, based on a degree of similarity between the physical sensor output value of the prediction target physical sensor and data learned by the statistical model;
comparing the physical sensor output value of the prediction target physical sensor with the virtual sensor output value of the virtual sensor, and determining whether an abnormality occurs in the prediction target physical sensor; and
switching from control of the substrate processing apparatus based on the physical sensor output value of the prediction target physical sensor to control of the substrate processing apparatus based on the virtual sensor output value of the virtual sensor when it is determined that the abnormality occurs in the prediction target physical sensor;
wherein the virtual sensor output value of the virtual sensor is predicted using the statistical model when the degree of similarity is higher than a threshold value, and the virtual sensor output value of the virtual sensor is predicted using the physical model when the degree of similarity is equal to or lower than the threshold value.

6. A control method executed by a substrate processing system provided with at least one substrate processing apparatus and an information processing apparatus communicatively connected to the substrate processing apparatus, the control method comprising:
acquiring a physical sensor output value output from a plurality of physical sensors installed in the substrate processing apparatus;
predicting a virtual sensor output value of a virtual sensor corresponding to a prediction target physical sensor among the plurality of physical sensors by using a statistical model that is constructed by a statistical technique or a physical model constructed by a physical technique, based on a degree of similarity between the physical sensor output value of the prediction target physical sensor and data learned by the statistical model;
comparing the physical sensor output value of the prediction target physical sensor with the virtual sensor output value of the virtual sensor, and determining whether an abnormality occurs in the prediction target physical sensor; and
switching from control of the substrate processing apparatus based on the physical sensor output value of the prediction target physical sensor to control of the substrate processing apparatus based on the virtual sensor output value of the virtual sensor when it is determined that the abnormality occurs in the prediction target physical sensor;
wherein the virtual sensor output value of the virtual sensor is predicted using the statistical model when the degree of similarity is higher than a threshold value, and the virtual sensor output value of the virtual sensor is predicted using the physical model when the degree of similarity is equal to or lower than the threshold value.

* * * * *